NARROW SPECTRAL RESPONSIVE P-N JUNCTION PHOTODIODE

Filed Feb. 26, 1968 2 Sheets-Sheet 1

INVENTORS
JOHN R. SIZELOVE
JOHN A. LOVE III

BY Harry A. Herbert Jr. and Robert Kern Duncan
ATTORNEYS

NARROW SPECTRAL RESPONSIVE P-N JUNCTION PHOTODIODE

Filed Feb. 26, 1968 2 Sheets-Sheet 2

INVENTORS
JOHN R. SIZELOVE
JOHN A. LOVE III

BY Harry A. Herbert Jr. and Robert Kern Duncan

ATTORNEYS

United States Patent Office 3,506,830
Patented Apr. 14, 1970

3,506,830

NARROW SPECTRAL RESPONSIVE P-N JUNCTION PHOTODIODE

John A. Love III and John R. Sizelove, Dayton, Ohio, assignors to the United States of America as represented by the Secretary of the Air Force Filed Feb. 26, 1968, Ser. No. 708,058
Int. Cl. G01j 3/00
U.S. Cl. 250—83.3 5 Claims

ABSTRACT OF THE DISCLOSURE

A low ohmic gallium arsenide semiconductor P–N junction wafer photodiode 200 microns thick having the junction in the center of the wafer wherein the light enters the diode on the N-type semiconductor side and through a specific bulk absorption-recombination action the photodiode has a narrow bandpass spectral response peaked at approximately 8960 angstroms.

BACKGROUND OF THE INVENTION

The field of this invention is in the P–N junction photodiode art.

Broadband P–N junction photodiodes are well known in the photodiode art. Generally a semiconductor material having a long bulk recombination lifetime is used in their fabrication and the P–N junction is placed very near the light-entering surface.

In many instances it is desirable to have a light sensing photodiode system that has a narrow spectral response. In order to obtain this narrow spectral response, separate optical filters have been used to filter the light before it enters the photodiode. The narrow spectral response is desirable in order to improve the signal-to-noise ratio of the device. For instance, when a broadband photodiode is used to sense infrared illumination, an optical filter has been used to filter out illumination in the other parts of the spectrum, since these signals would appear as unwanted noise in the output of the photodiode.

SUMMARY OF THE INVENTION

A lightweight, low cost, compact P–N junction photodiode is provided that inherently has a high Q, narrow spectral infrared response, without the use of optical filters.

DESCRIPTION OF THE PREFERRED EMBODIMENT

Figure 1:
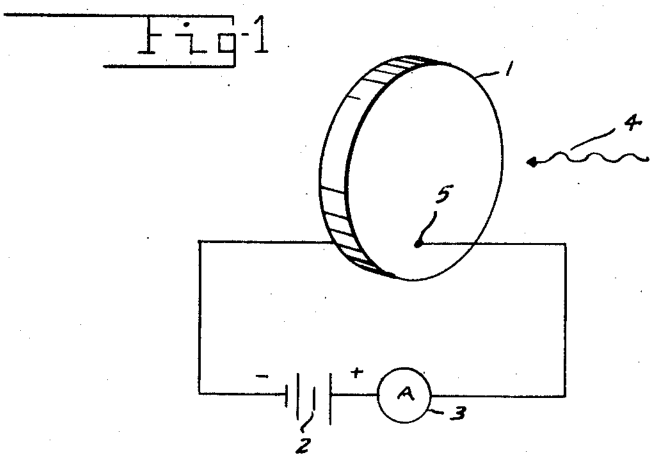
FIG. 1 is a pictorial view of an embodiment of the invention.

Referring to FIG. 1, a P–N junction photodiode wafer 1 is shown that is back-biased by the battery 2; that is, the N-type material receives the positive charge from the battery. The current indicating meter 3 indicates the response to the light energy 4 impinging on the wafer. The light energy normally enters the N side of the device. This figure is not only applicable to this invention but to prior art devices as well. The techniques of making the ohmic electrical contacts 5, and 6 and 7 of FIG. 2, to the wafer are well known.

As previously stated, in the prior art devices, the position of the P–N junction has been near the surface of the diode. The prior art devices have been characterized by having broadband responses and relatively high quantum efficiencies. This invention teaches the fabrication of a single crystal P–N junction photodiode that has a narrow spectral response. This narrow spectral response is obtained primarily by placing the junction deep within the photodiode element, preferably at or near the center; by using a determined thickness of the diode element; a determined ratio of the thickness of the N material and the P material of the element to their respective minority carrier bulk diffusion recombination path lengths, and by having the back bias voltage sufficiently low enough in value to maintain essentially minimal majority carrier depletion in both the P-type and N-type materials of the element. To obtain a high Q it is also necessary to use a material that decays rapidly in absorption coefficient at the adsorption edge of the material characteristic, such as exhibited by direct band-gap semiconductor material. Thus, gallium arsenide is generally a preferred material to silicon and germanium, however, an operating model fabricated from a silicon crystal wafer gave very satisfactory results but had a lower Q than the gallium-arsenide units provide. These and other factors pertinent to the construction of this device will be better understood after considering the following detailed description of a preferred embodiment and its operating characteristics.

Figure 2:
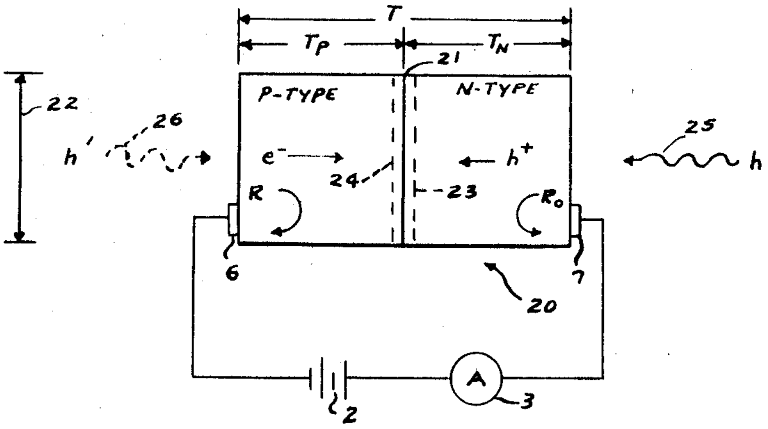
FIG. 2 is a diagrammatic view of a P–N junction crystal photodiode having a narrow bandpass spectral response.
Figure 3:
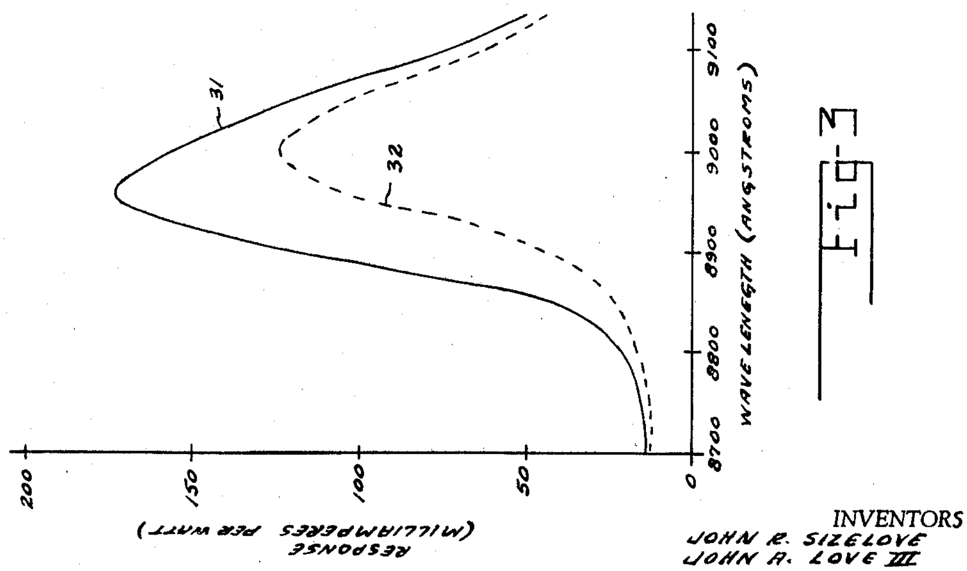
FIG. 3 is a plot of the response characteristics of an embodiment of the invention.

Referring to FIG. 2 a single crystal disc of gallium arsenside 20, fabricated to possess essentially the following parameters and having the junction 21 essentially at the center of the wafer, will provide the response characteristics shown in FIG. 3. The techniques used in forming the various parameters are well known, as is the fabrication of the junction at various depths within the crystal. It is in the forming of the proper combination of these factors in fabricating the photodiode, and in applying the proper back biasing to the photodiode, that this invention resides.

The approximate diameter 22 of the crystal disc is one-half centimeter.

The total thickness T of the disc is 200 microns.

The thickness of N-doped section $T_N$ and the thickness of P-doped section $T_P$ are 100 microns respectively.

The products of each of the thicknesses of the N-type material and the P-type material and their respective light energy absorption coefficients are approximately 1.2, that is, $\alpha_N T_N \cong 1.2$, and $\alpha_P T_P \cong 1.2$, where $\alpha$ is the absorption coefficient per micron of the material at the designed response peak. (In fabricating a particular device from a particular material to have a response peak at a desired wavelength, the suggested procedure is to obtain the value of the coefficient of absorption of the material at that wavelength and proportion the thickness of the material such that the $\alpha$T product has approximately the desired value of 1.2.)

The minority carrier bulk recombination path length $l$ in both materials is 25 microns; where $l$ is defined by $\sqrt{.025\mu_m\tau_0}$ at room temperature, in which $\mu_m$ is the mobility of the minority carrier of the material and has a value (in this specific embodiment) of approximately 250 cm.²/volt-second, and $\tau_0$ is the means free time for the minority carrier hole-electron bulk recombination, having a value in this embodiment of approximately one microsecond; the value of $l$ in the N-type material may be designed $l_N$ and in the P-type material $l_P$, thus$T_N/l_N$ and $T_P/l_P$ are approximately equal to four. This ratio of four is critical in the determination of the bandwidth of the response characteristic of the device. The Q of this specific embodiment being set forth is approximately 45, where Q is defined as $\lambda/\Delta\lambda$, where $\lambda$ is the center wavelength (8960 angstroms) and $\Delta\lambda$ is the response width at the 3 db power points (200 angstroms).

The resistivity $\rho$ of the material (in both the N- and P-types) is approximately ten ohm-centimeters.

The doping concentrations in both types (N and P) is approximately $3\times10^{16}$ per cc.

The reverse bias voltage 2 across the crystal element is arpproximately 1.6 volts.

The depletion depths 23 and 24 are approximately two microns. This value is determined by the resistivity of the material and the magnitude of the reverse bias voltage and may be approximately expressed by $\frac{1}{2}\sqrt{\rho V}$ where V is the magnitude of the reverse bias voltage.

When the preferred specific embodiment just enumerated is exposed to light energy impinging on the faces of the crystal as shown in FIG. 2, the response characteristic 31 (of FIG. 3) is obtained for light 25 entering the N side and response characteristic 32 is obtained for light 26 entering the P side. It is to be observed that a narrow spectral response is obtained for both conditions with the response peaks occurring at slightly different frequencies. Generally, due to the higher sensitivity, it is preferable to utilize the N side to receive the light radiation. The quantum efficiency at the peak of the N side response characteristic, (i.e., at approximately 8960 angstroms), is approximately 24 percent and it is likewise approximately 18 percent for the P side at 9000 angstroms.

Figure 4:
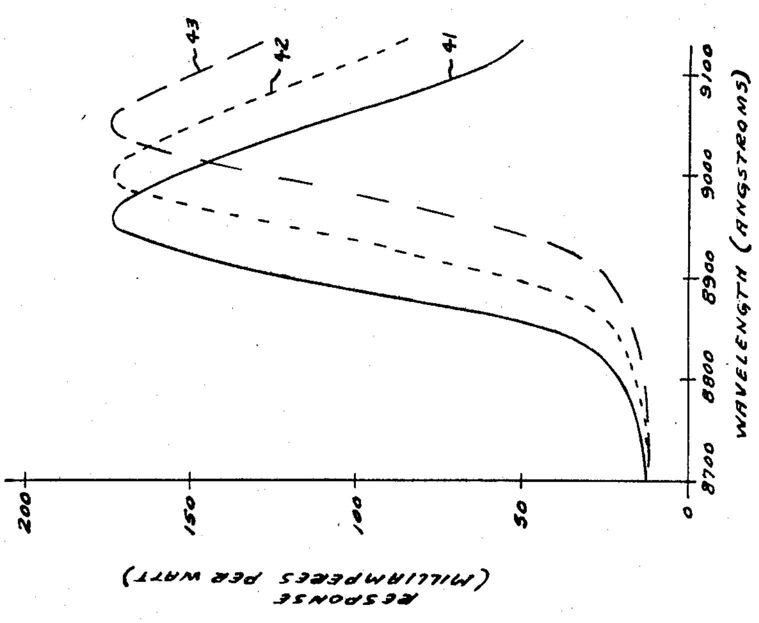
FIG. 4 is a plot of the responses of three different embodiments of the invention, each having a different spectral response characteristic.

FIG. 4 shows the platted response characteristics of three embodiments of different thicknesses. All three have the values of $T_P/l_P \cong T_N/l_N \cong 4$, absorption coefficients thickness products $\alpha_N T_N \cong \alpha_P T_P \cong 1.2$ at their response peaks, the junction in the center, and a back bias voltage of approximately 1.6 volts. The total thickness of the crystal for curve 41 is 200 microns. This curve is the same as curve 31 of FIG. 3. The curve 42 is for a device having a total thickness of 400 microns and curve 43 is for a 800 microns thick element.

We claim:

1. A P–N junction photodiode having a narrow spectral response in the infrared region of the electromagnetic spectrum comprising:

(a) a single crystal photodiode element having, a P–N junction essentially at the center of the element with essentially one-half of the element being N-type material and one-half the element being P-type material.

a ratio of the thickness of the N-type material to the minority carrier bulk recombination path length in the N-type material of essentially 4 to 1, and a ratio of the thickness of the P-type material to the minority carrier bulk recombination path length in the P-type material of essentially 4 to 1;

(b) direct current voltage means for back biasing the photodiode element; and (c) direct current indicating means cooperating with the said voltage means and the said photodiode element for indicating the current flow through the said photodiode.

2. The photodiode as claimed in claim 1 wherein the said direct current voltage means for back biasing the photodiode element is a voltage means for providing essentially a minimum majority carrier depletion in both the P-type and the N-type materials of the photodiode element.

3. The photodiode as claimed in claim 1 wherein the said single crystal element is a gallium arsenide crystal element.

4. The photodiode as claimed in claim 3 wherein the direct current voltage means has a voltage potential value between 1 and 3 volts.

5. A narrow band infrared light energy sensor comprising:

(a) a single crystal gallium arsenide element having a defined value of thickness of N-type material and essentially an equal defined value of thickness of P-type material providing a P–N junction and having the ratio of each of the said defined thicknesses to the minority carrier bulk recombination path length in each of the said materials of approximately 4 to 1;

(b) direct current voltage means having a positive and a negative charge polarity and a magnitude of approximately 2 volts cooperating with the said single crystal element whereby the N-type material is charged positively and the P-type material is charged negatively; and (c) current indicating means cooperating with the said direct current voltage means and the said single crystal element for indicating the current flowing through the said crystal element.

References Cited

UNITED STATES PATENTS

| | | |
|---|---|---|
| 3,198,012 | 8/1965 | Argue et al. |
| 3,366,793 | 1/1968 | Svedberg. |
| 3,369,132 | 2/1968 | Fang et al. |

ARCHIE R. BORCHELT, Primary Examiner

U.S. Cl. X.R.

250—211